(12) United States Patent  
Hanya et al.

(10) Patent No.: US 8,934,203 B2  
(45) Date of Patent: Jan. 13, 2015

(54) DISK DRIVE SUSPENSION

(71) Applicant: NHK Spring Co., Ltd., Yokohama (JP)

(72) Inventors: Masao Hanya, Aiko-gun (JP); Kenichi Takikawa, Aiko-gun (JP); Toshiki Ando, Aiko-gun (JP); Masaru Inoue, Aiko-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/929,711

(22) Filed: Jun. 27, 2013

(65) Prior Publication Data

US 2014/0022675 A1    Jan. 23, 2014

(30) Foreign Application Priority Data

Jul. 19, 2012 (JP) .................................. 2012-160866

(51) Int. Cl.
*G11B 5/56*  (2006.01)
*G11B 5/48*  (2006.01)

(52) U.S. Cl.
CPC .............. *G11B 5/4813* (2013.01); *G11B 5/482* (2013.01)
USPC .................... 360/294.4; 360/245.3; 360/245.9

(58) Field of Classification Search
USPC ........... 260/294.1–294.4, 294.6, 245.3, 245.9
See application file for complete search history.

(56) References Cited

U.S. PATENT DOCUMENTS

| 6,738,231 | B2* | 5/2004 | Arya et al. .................. 360/294.4 |
| 6,791,783 | B2* | 9/2004 | Nakagawa ...................... 360/75 |
| 8,179,745 | B2 | 5/2012 | Nakamura et al. |
| 8,593,765 | B2* | 11/2013 | Uematsu et al. ........... 360/294.4 |
| 2011/0096438 | A1 | 4/2011 | Takada et al. |
| 2011/0149440 | A1* | 6/2011 | Uematsu et al. ........... 360/245.3 |
| 2014/0022674 | A1* | 1/2014 | Takikawa et al. .......... 360/244.5 |
| 2014/0085755 | A1* | 3/2014 | Hanya et al. ............... 360/244.5 |

FOREIGN PATENT DOCUMENTS

| JP | 2010-146631 A | 7/2010 |
| JP | 2010-218626 A | 9/2010 |

* cited by examiner

*Primary Examiner* — Will J Klimowicz
(74) *Attorney, Agent, or Firm* — Holtz, Holtz, Goodman & Chick PC

(57) ABSTRACT

A microactuator element is disposed on a gimbal portion of a flexure. A first end of the element is secured to a first supporting portion by a first insulating adhesive. A second end is secured to a second supporting portion by a second insulating adhesive. A first conductor is disposed on the first supporting portion. A second conductor on the ground side is disposed on the second supporting portion. A first electrode is disposed on a first end of the element. A first electrically conductive paste is provided between the first electrode and the first conductor. A second electrode is disposed on a second end of the element. A second electrically conductive paste is provided between the second electrode and the second conductor.

8 Claims, 14 Drawing Sheets

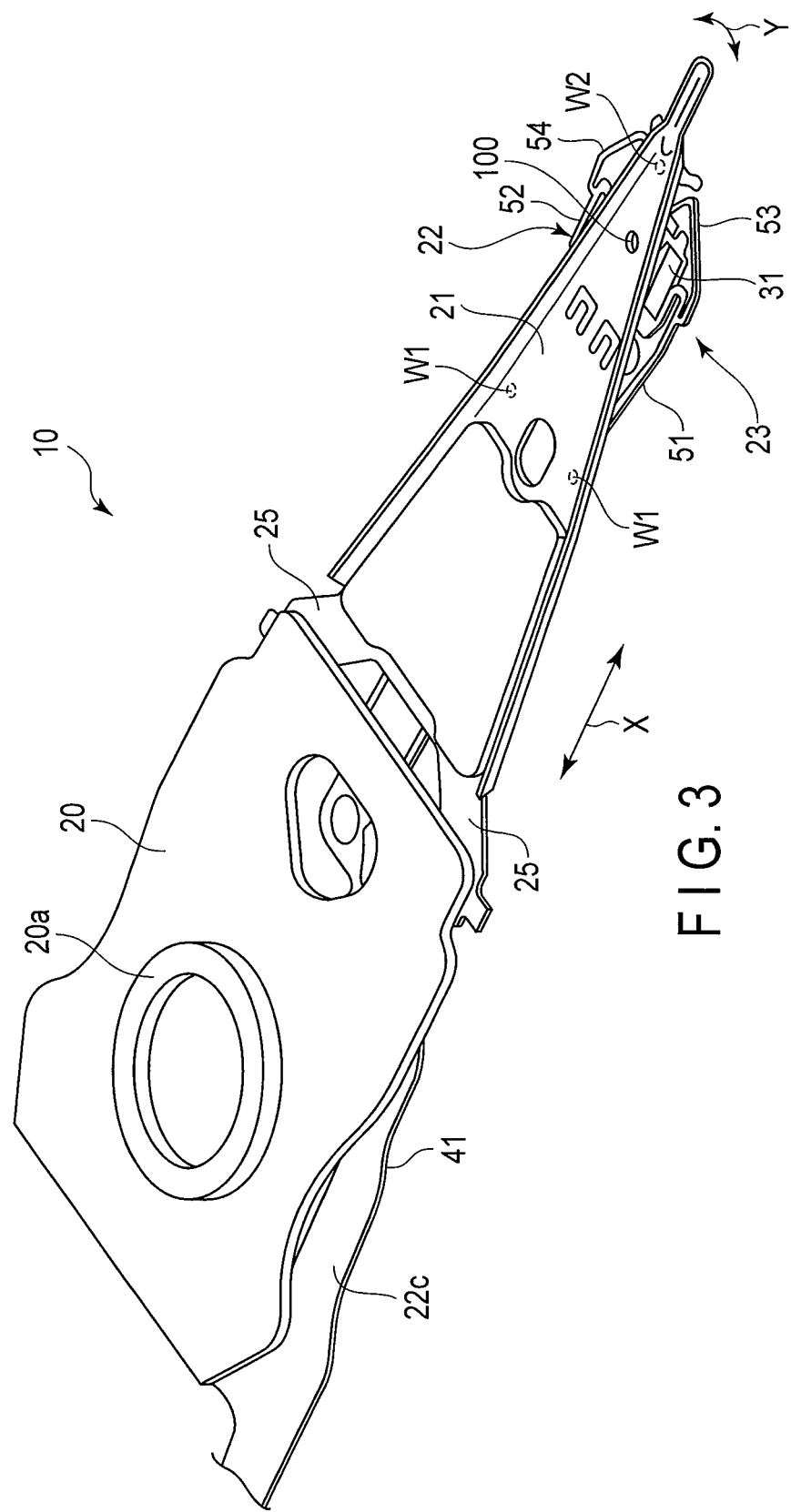
F I G. 3

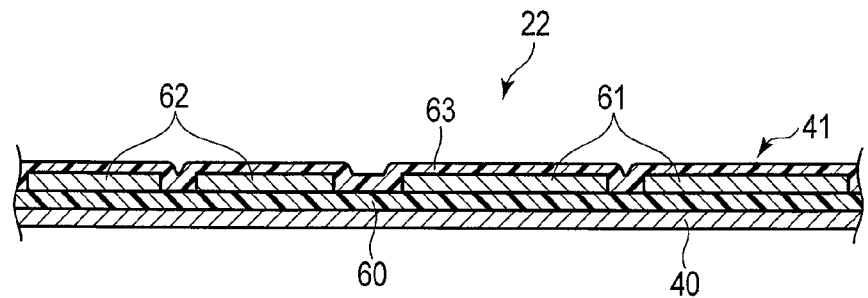
F I G. 8
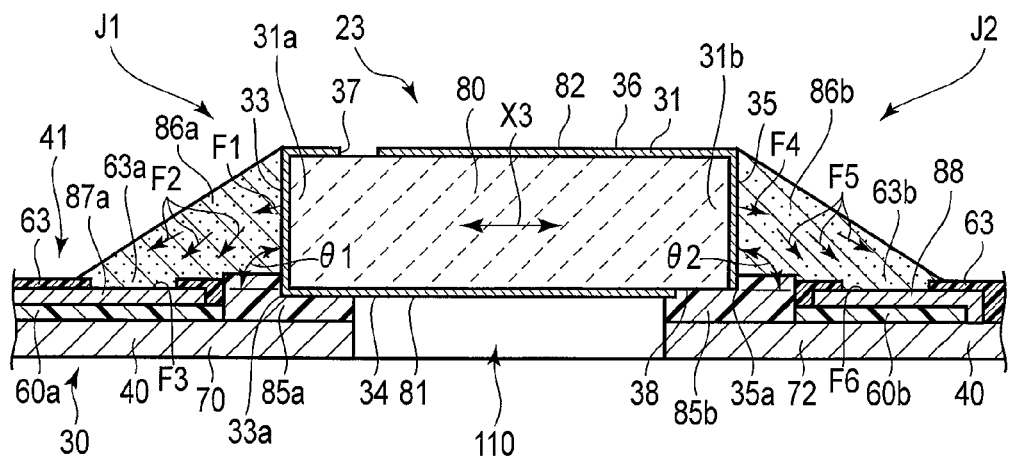
F I G. 9
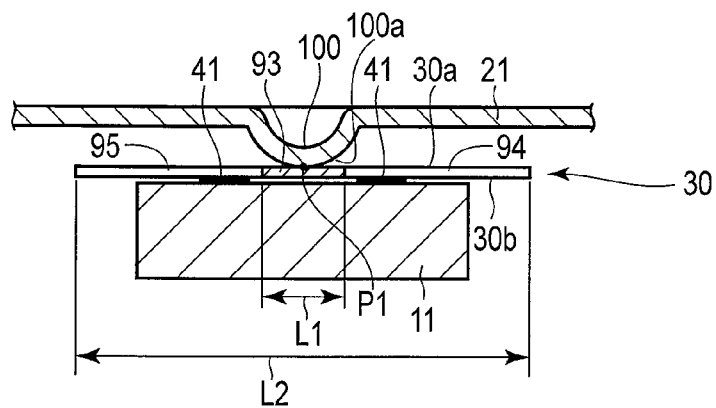
F I G. 10

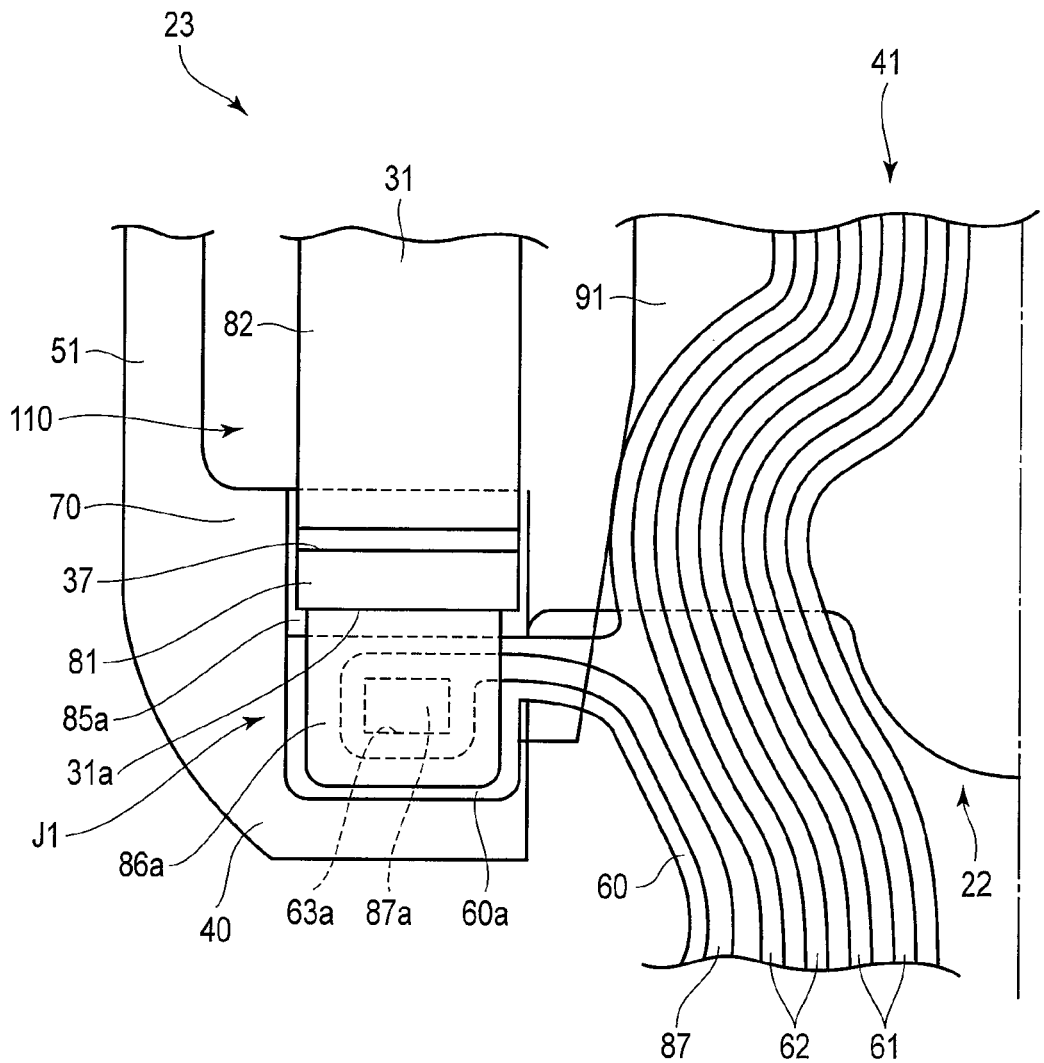
F I G. 12

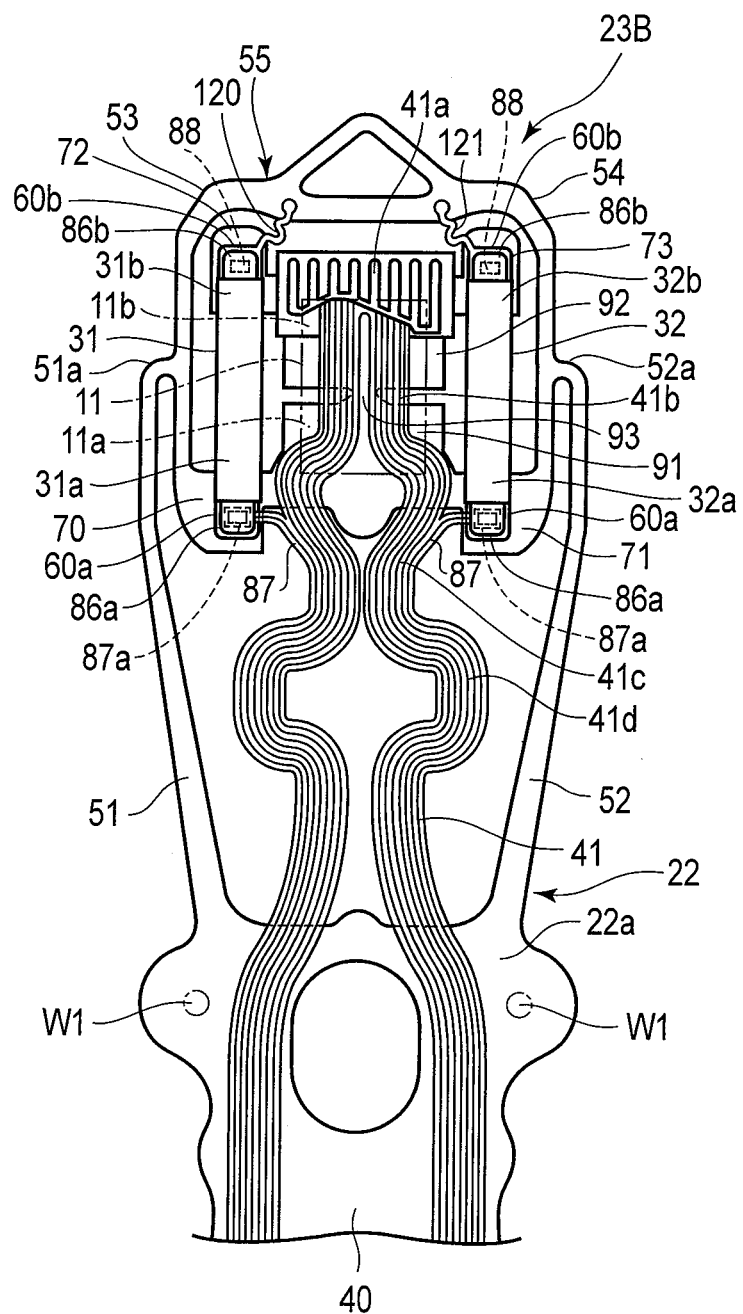
F I G. 16

DISK DRIVE SUSPENSION

CROSS-REFERENCE TO RELATED APPLICATIONS

This application is based upon and claims the benefit of priority from prior Japanese Patent Application No. 2012-160866, filed Jul. 19, 2012, the entire contents of which are incorporated herein by reference.

BACKGROUND OF THE INVENTION

1. Field of the Invention

This invention relates to a disk drive suspension comprising a microactuator element of, for example, lead zirconate titanate (PZT).

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks of the disk about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing data. The load beam, flexure, slider, etc., constitute a head gimbal assembly.

In order to overcome the increase in the recording density of disks, the magnetic head should be more precisely positioned relative to the recording surface of each disk. To attain this, dual-stage-actuator (DSA) suspensions have been developed that combine a positioning motor (voice coil motor) and microactuator element made of a piezoelectric material, such as lead zirconate titanate (PZT).

The distal end of the suspension can be quickly moved by an infinitesimal distance in a sway direction (or transversely relative to tracks) by applying a voltage to and thereby deforming the actuator element. As disclosed in Jpn. Pat. Appln. KOKAI Publications Nos. 2010-146631 (Patent Document 1) and 2010-218626 (Patent Document 2), moreover, there are known DSA suspensions in which a microactuator element is disposed on a gimbal portion of a flexure.

In a head gimbal assembly in which a slider and microactuator element are mounted on a gimbal portion, the microactuator element is secured to the gimbal portion by an adhesive. For electrical conduction between a conductive circuit portion and an electrode of the microactuator element, moreover, an electrically conductive paste, such as a silver paste, is applied to a conductor of the conductive circuit portion. An electrode part of the microactuator element is superposed on the paste.

In the case of such a conventional joint structure, an adhesive surface between the electrode part of the microactuator element and the electrically conductive paste is parallel to the direction of extension and contraction (stroke direction) of the microactuator element. Thus, an in-plane shearing force is applied to the adhesive surface as the microactuator element extends and contracts. The electrically conductive paste on the adhesive surface is more fragile and less adhesive than an adhesive, such as an epoxy resin. If the in-plane shearing force is repeatedly applied to the adhesive surface, slippage may occur on the adhesive surface, resulting in separation of the adhesive surface. The separation of the adhesive surface causes defective continuity. In the case where a slit for electrical insulation is formed in a part of the peripheral surface of the microactuator element, the electrically conductive paste is located near the slit. Accordingly, the paste may get into the slit, thereby causing an inter-electrode short circuit.

According to another conventional example, a conducting member, such as a lead wire or bonding wire, may be connected to the electrode of the microactuator element so that they electrically conduct to each other. In this case, the conducting member is disposed near the surface of the microactuator element. Possibly, therefore, the element may be damaged by contact with the conducting member if subjected to external mechanical shock.

BRIEF SUMMARY OF THE INVENTION

Accordingly, the object of this invention is to provide a disk drive suspension configured so that electrical connection between electrodes of microactuator elements and conductors can be ensured and conducting members, such as lead wires, can be kept from being located near the surfaces of the microactuator elements.

A disk drive suspension according to an embodiment comprises a load beam and a flexure formed of a metal base. The flexure comprises a stationary part secured to the load beam and a gimbal portion on which the slider is mounted. A pair of microactuator elements are disposed on either side of the slider. Each of the microactuator elements comprises a first end portion and a second end portion arranged in a direction (stroke direction) in which the element extends and contracts. A part of the gimbal portion is formed with a pair of first supporting portions to which the respective first end portions of the pair of microactuator elements are secured, a pair of second supporting portions to which the respective second end portions of the microactuator elements are secured, and a tongue on which the slider is mounted. A first conductor is provided on each of the first supporting portions. A second conductor is provided on each of the second supporting portions. A first electrode is provided on at least an end surface of each of the first end portions of the microactuator elements. A second electrode is provided on at least an end surface of each of the second end portions of the microactuator elements. The first end portions and the first supporting portions are secured to one another by an electrically insulating first adhesive. The second end portions and the second supporting portions are secured to one another by an electrically insulating second adhesive. A first electrically conductive paste is provided between the first conductor and the first electrode on the end surface of the first end portion. The first electrically conductive paste electrically connects the first electrode and the first conductor to each other. A second electrically conductive paste is provided between the second conductor and the second electrode on the end surface of the second end portion. The second electrically conductive paste electrically connects the second electrode and the second conductor to each other.

According to the arrangement of this embodiment, adhesive surfaces of the electrically conductive pastes between the electrodes of the microactuator elements and the conductors on the supporting portions can be made less easily separable. Accordingly, the electrical connection by the electrically conductive pastes can be ensured even if the microactuator elements are repeatedly extended and contracted by application of a voltage. It is unnecessary, moreover, to dispose conducting members, such as lead wires or bonding wires, near the surfaces of the microactuator elements. Thus, the microactuator elements can be prevented from being damaged by contact with the conducting members.

In the embodiment described above, the tongue may comprise a first tongue portion, a second tongue portion, and a hinge portion. The first tongue portion is formed between the pair of first supporting portions. A leading-side portion of the slider is disposed for movement on the first tongue portion. The second tongue portion is formed between the pair of second supporting portions. A trailing-side portion of the slider is secured to the second supporting portion. The hinge portion is formed between the first and second tongue portions. The hinge portion is narrower than the first and second tongue portions and pivotably connects the tongue portions. In this embodiment, the distal end of a convex surface of a dimple formed on the load beam may be configured to abut the hinge portion.

An example of the second conductor is a ground-side conductor for electrical connection between the metal base and the second electrode of each of the microactuator elements. The disk drive suspension may comprise cover layer which covers the first conductor and comprises a first opening and a cover layer which covers the second conductor and comprises a second opening. A part of an upper surface of the first conductor is exposed through the first opening. A part of the first electrically conductive paste is cured in the first opening. A part of an upper surface of the second conductor is exposed through the second opening. A part of the second electrically conductive paste is cured in the second opening.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a suspension according to a first embodiment;

FIG. 8 is a partial sectional view of a conductive circuit portion of a flexure of the suspension;

FIG. 9 is a sectional view of the microactuator mounting section of FIG. 4;

FIG. 10 is a sectional view showing a dimple on a load beam and a part of a gimbal portion;

FIG. 12 is an enlarged bottom view of a first joint portion of the microactuator element of FIG. 7;

FIG. 16 is a bottom view of a microactuator mounting section according to a third embodiment.

DETAILED DESCRIPTION OF THE INVENTION

A disk drive suspension according to a first embodiment of the present invention will now be described with reference to FIGS. 1 to 14.

Figure 1:
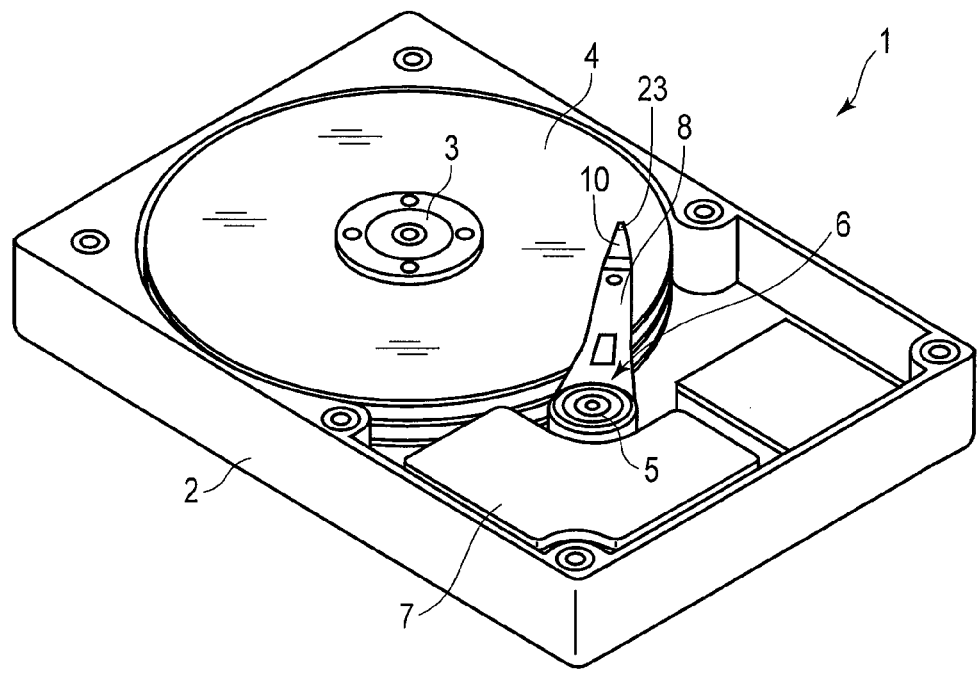
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a lid (not shown).

Figure 2:
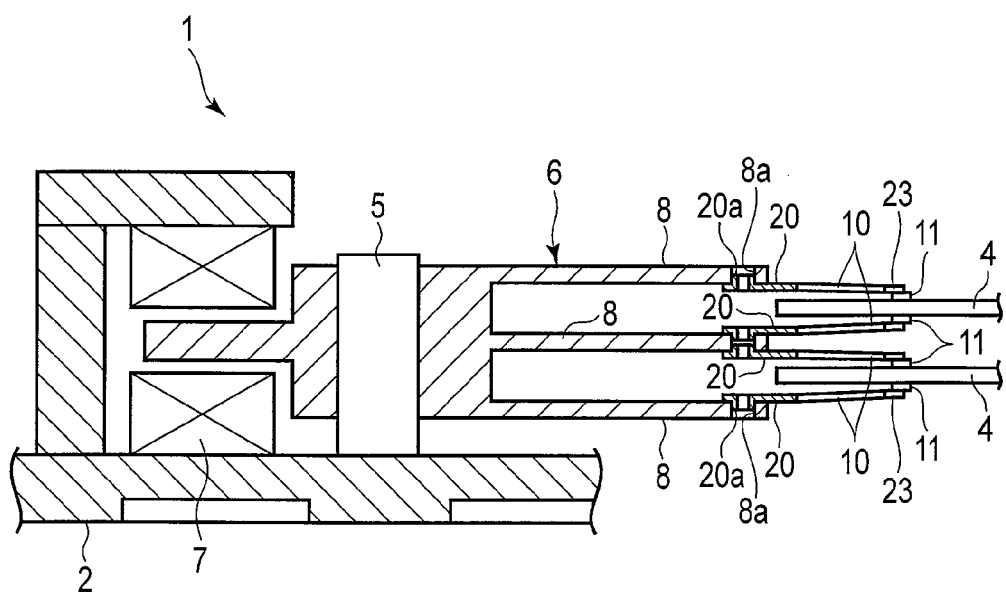
FIG. 2 is a partial sectional view of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider, 11, which constitutes a magnetic head, is provided on the distal end portion of the suspension 10. In a state where each disk 4 rotates at high speed, an air bearing is formed between the disk and the slider 11 as air flows in between the disk 4 and slider 11. If the carriage 6 is turned by the positioning motor 7, the suspension 10 moves radially relative to the disk 4. Thereupon, the slider 11 moves to a desired track of the disk 4.

FIG. 3 shows the suspension 10 of the dual-stage-actuator (DSA) type. This suspension 10 comprises a baseplate 20 secured to its corresponding arm 8 (FIGS. 1 and 2) of the carriage 6, load beam 21, flexure 22 with conductors, microactuator mounting section 23 located near the distal end of the suspension 10, etc. A boss portion 20a to be inserted into a hole 8a (FIG. 2) in each arm 8 is formed on the baseplate 20.

In FIG. 3, arrows X and Y indicate the longitudinal direction of the load beam 21, that is, the longitudinal direction (front-rear direction) of the suspension 10, and a sway direction (transverse direction of the slider 11), respectively. Spring portions 25 capable of thicknesswise springy deformation are formed on the proximal portion (rear end portion) of the load beam 21. The flexure 22 is disposed along the load beam 21.

Figure 4:
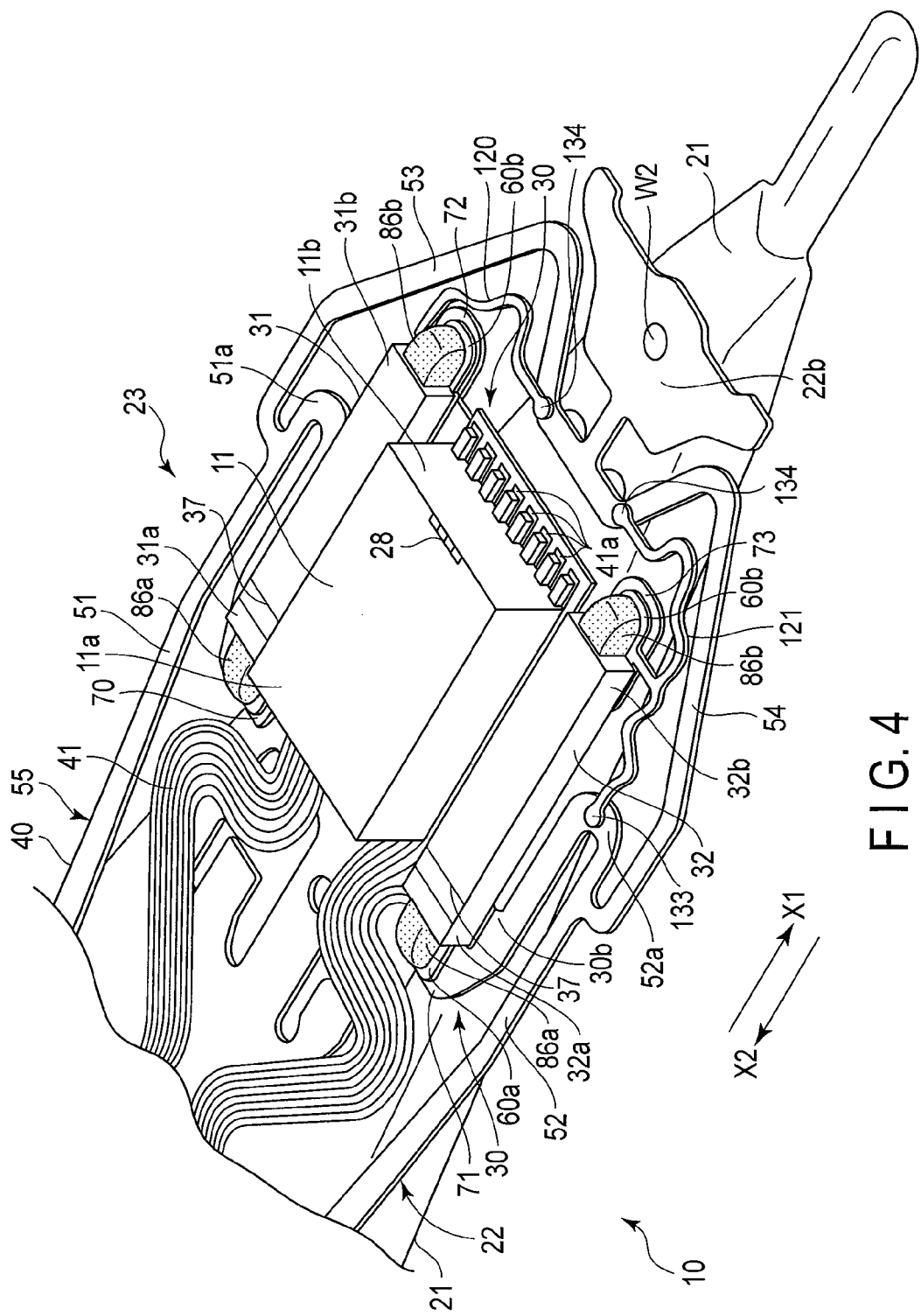
FIG. 4 is a perspective view of a microactuator mounting section of the suspension of FIG. 3 taken from a slider.

FIG. 4 is a perspective view of the microactuator mounting section 23 taken from the side of the slider 11. Microactuator mounting section 23 is disposed on the distal end portion of the suspension 10. Elements 28, such as magnetoresistive (MR) elements capable of conversion between magnetic and electrical signals, are disposed on an end portion of the slider 11 that constitutes the magnetic head. These elements 28 serve to access data, that is, write or read data to or from the disk 4. The slider 11, load beam 21, flexure 22, etc., constitute a head gimbal assembly.

Microactuator mounting section 23 comprises a gimbal portion 30 formed on the distal end portion of the flexure 22 and a pair of microactuator elements 31 and 32. These microactuator elements 31 and 32 are disposed individually on the opposite sides of the slider 11 on the gimbal portion 30. Microactuator elements 31 and 32 are formed of piezoelectric plates of PZT or the like and have the function of pivoting the slider 11 in the sway direction by means of a structure described in detail later.

Figure 5:
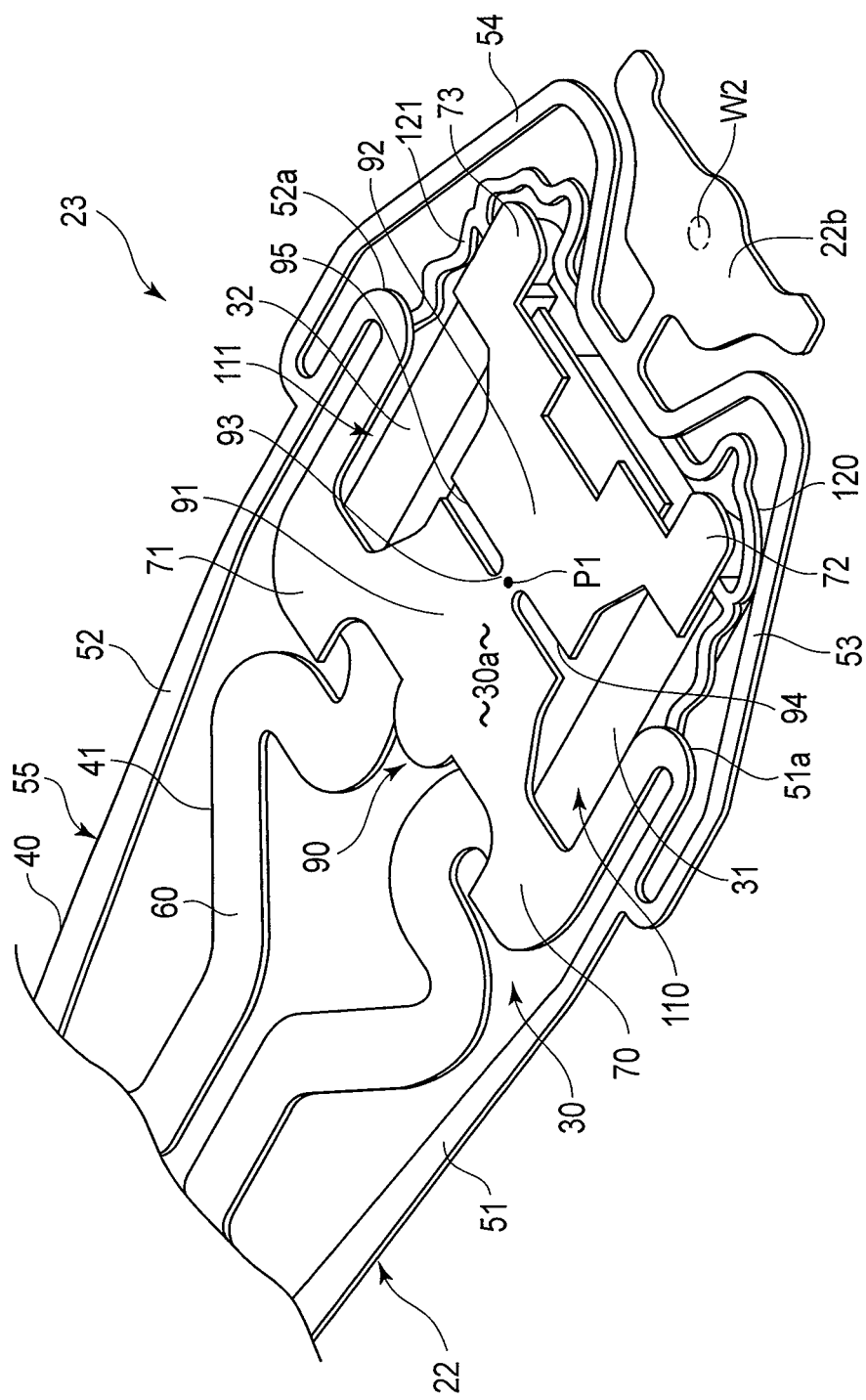
FIG. 5 is a perspective view of the microactuator mounting section of FIG. 4 taken from a tongue.
Figure 6:
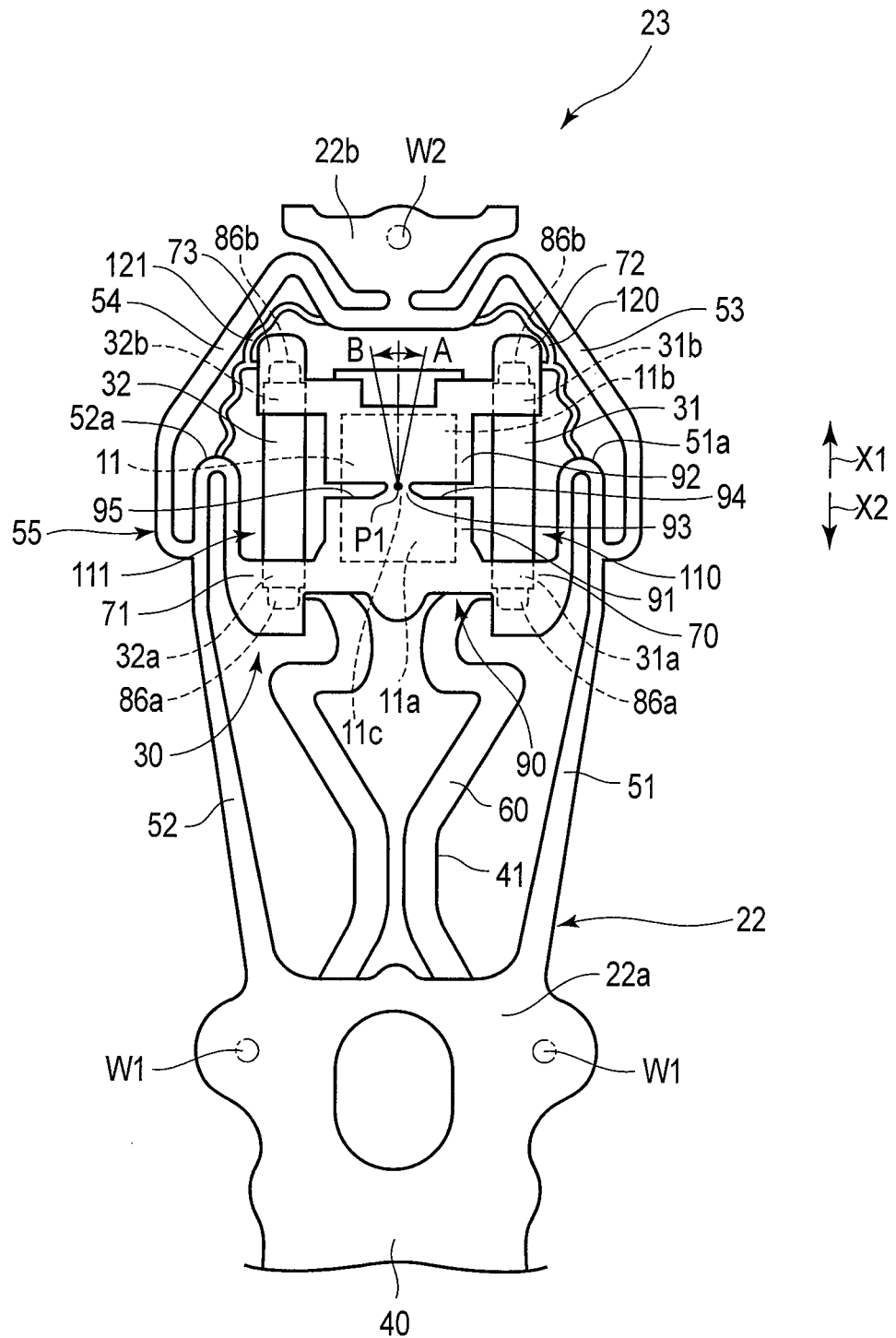
FIG. 6 is a plan view of the microactuator mounting section of FIG. 5.
Figure 7:
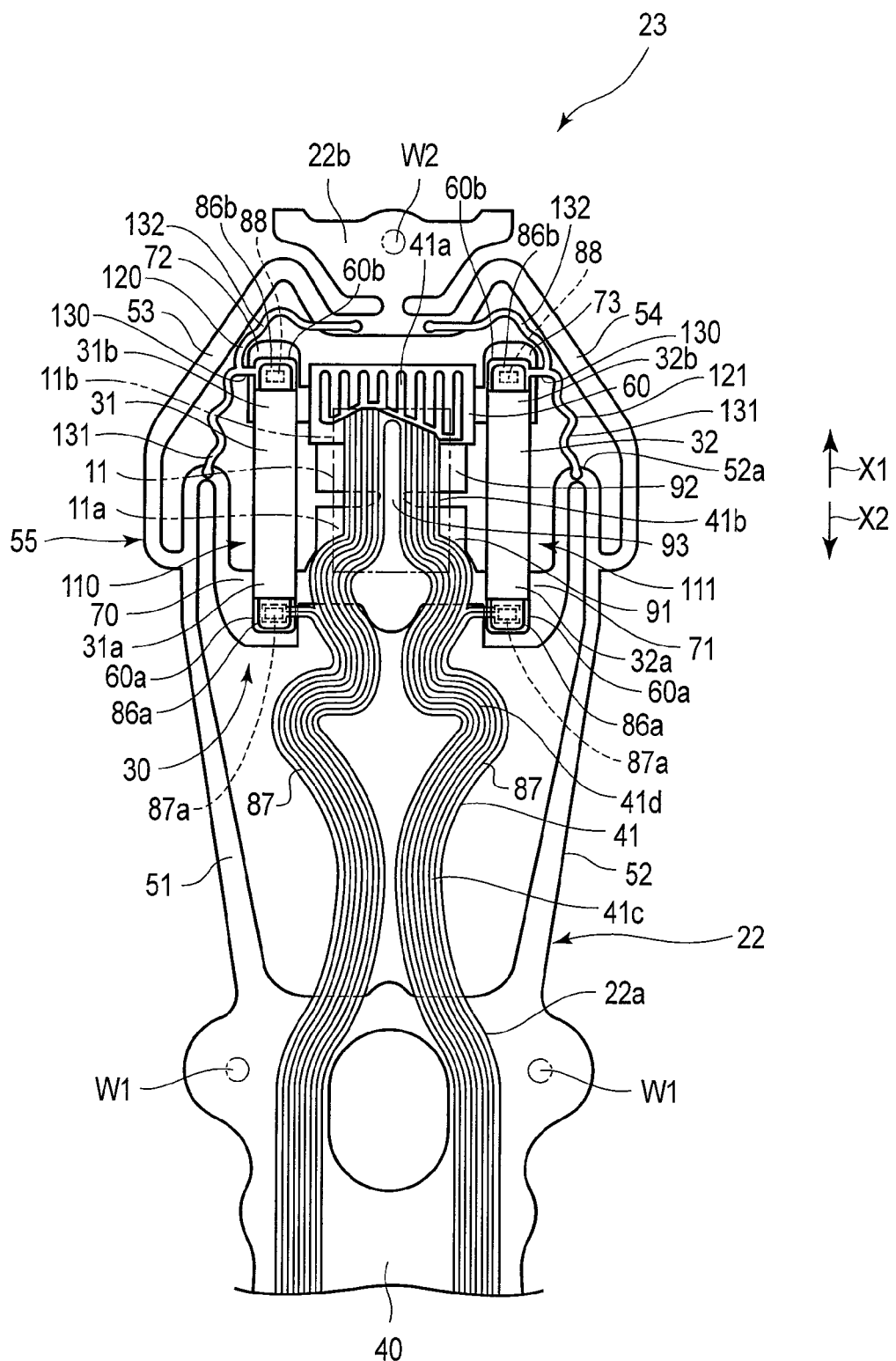
FIG. 7 is a bottom view of the microactuator mounting section of FIG. 5 taken from the side opposite to FIG. 5.

FIG. 5 is a perspective view of the gimbal portion 30 on the distal end portion of the flexure 22 taken from the side opposite to FIG. 4. Microactuator elements 31 and 32 are disposed on the gimbal portion 30. FIG. 6 is a plan view showing the gimbal portion 30 and microactuator elements 31 and 32. The flexure 22 comprises a metal base 40, formed of a stainless-steel plate, and a conductive circuit portion 41. The conductive circuit portion 41 is disposed along the metal base 40. The conductive circuit portion 41 comprises a part overlapping the metal base 40 and a part not overlapping the metal base 40. FIG. 7 is a bottom view of the microactuator mounting section 23 taken from the side of the conductive circuit portion 41.

The metal base 40 is secured to the load beam 21. An example of fixing means comprises first welds W1 (FIGS. 3, 6, 7, etc.) and a second weld W2 (FIGS. 3 to 7) formed by laser welding. The flexure 22 comprises first and second stationary parts 22a and 22b. The first stationary part 22a is secured to the load beam 21 by weld W1 at a front-rear intermediate portion of the suspension 10. The second stationary part 22b is secured to the load beam 21 by weld W2 in a position near the distal end of the flexure 22. A rear portion 22c (FIG. 3) of the flexure 22 extends rearward from the baseplate 20.

As shown in FIGS. 5 to 7, the metal base 40 of the flexure 22 comprises a pair of first arms 51 and 52 and a pair of second arms 53 and 54. The first arms 51 and 52 connect with the first stationary part 22a, and the second arms 53 and 54 with the second stationary part 22b. Respective distal end portions 51a and 52a of the first arms 51 and 52 are U-shaped. The respective rear ends of the second arms 53 and 54 are connected to the vicinity of the distal end portions 51a and 52a. The first arms 51 and 52 and second arms 53 and 54 constitute an arm portion 55 for elastically supporting the gimbal portion 30.

FIG. 8 shows an example of cross-sections of the metal base 40 and conductive circuit portion 41. The conductive circuit portion 41 comprises an insulating layer 60, write conductors 61, read conductors 62, and cover layer 63. The insulating layer 60 and cover layer 63 are made of an electrically insulating resin, such as polyimide. The conductors 61 and 62 are formed on the insulating layer 60. The cover layer 63 covers the conductors 61 and 62. The write and read conductors 61 and 62 are connected to the elements 28 of the slider 11. For example, the metal base 40 is 20 μm (12 to 25 μm) thick; insulating layer 60, 10 μm (5 to 20 μm) thick; conductors 61 and 62, 9 μm (4 to 15 μm) thick; and cover layer 63, 5 μm (2 to 10 μm). The thickness of the metal base 40 is smaller than that (e.g., 30 μm) of the load beam 21.

The pair of microactuator elements 31 and 32 are disposed on the gimbal portion 30 of the flexure 22. The gimbal portion 30 comprises a first surface 30a (FIGS. 5 and 10) facing the load beam 21 and a second surface 30b (FIGS. 4 and 10) opposite to the first surface 30a. The slider 11 and microactuator elements 31 and 32 are disposed on the second surface 30b.

Microactuator elements 31 and 32 comprise first end portions 31a and 32a and second end portions 31b and 32b, respectively. Arrows X1 and X2 in FIGS. 4, 6 and 7 indicate forward and rearward directions, respectively, with respect to microactuator elements 31 and 32. The first end portions 31a and 32a of microactuator elements 31 and 32 are secured to a pair of first supporting portions 70 and 71, respectively, formed on the gimbal portion 30. The first supporting portions 70 and 71 connect with the first stationary part 22a of the flexure 22 through the flexible first arms 51 and 52, respectively. The distal end portions 51a and 52a of the first arms 51 and 52 connect with the second stationary part 22b of the flexure 22 through the second arms 53 and 54, respectively. Thus, the first supporting portions 70 and 71 are supported on the stationary parts 22a and 22b by the arm portion 55 that can be elastically deformed relative to the load beam 21. The arm portion 55 comprises the first arms 51 and 52 and second arms 53 and 54. The second end portions 31b and 32b of the microactuator elements 31 and 32 are secured to a pair of second supporting portions 72 and 73, respectively, formed on the gimbal portion 30.

FIG. 9 shows cross-sections of joint portions J1 and J2 of the one microactuator element 31 (of the pair of microactuator elements 31 and 32). Microactuator element 31 comprises the opposite end portions 31a and 31b formed on its longitudinal opposite ends. Arrow X3 in FIG. 9 indicates the longitudinal direction of the microactuator element 31, that is, the direction (stroke direction) in which the element 31 extends and contracts.

Figure 13:
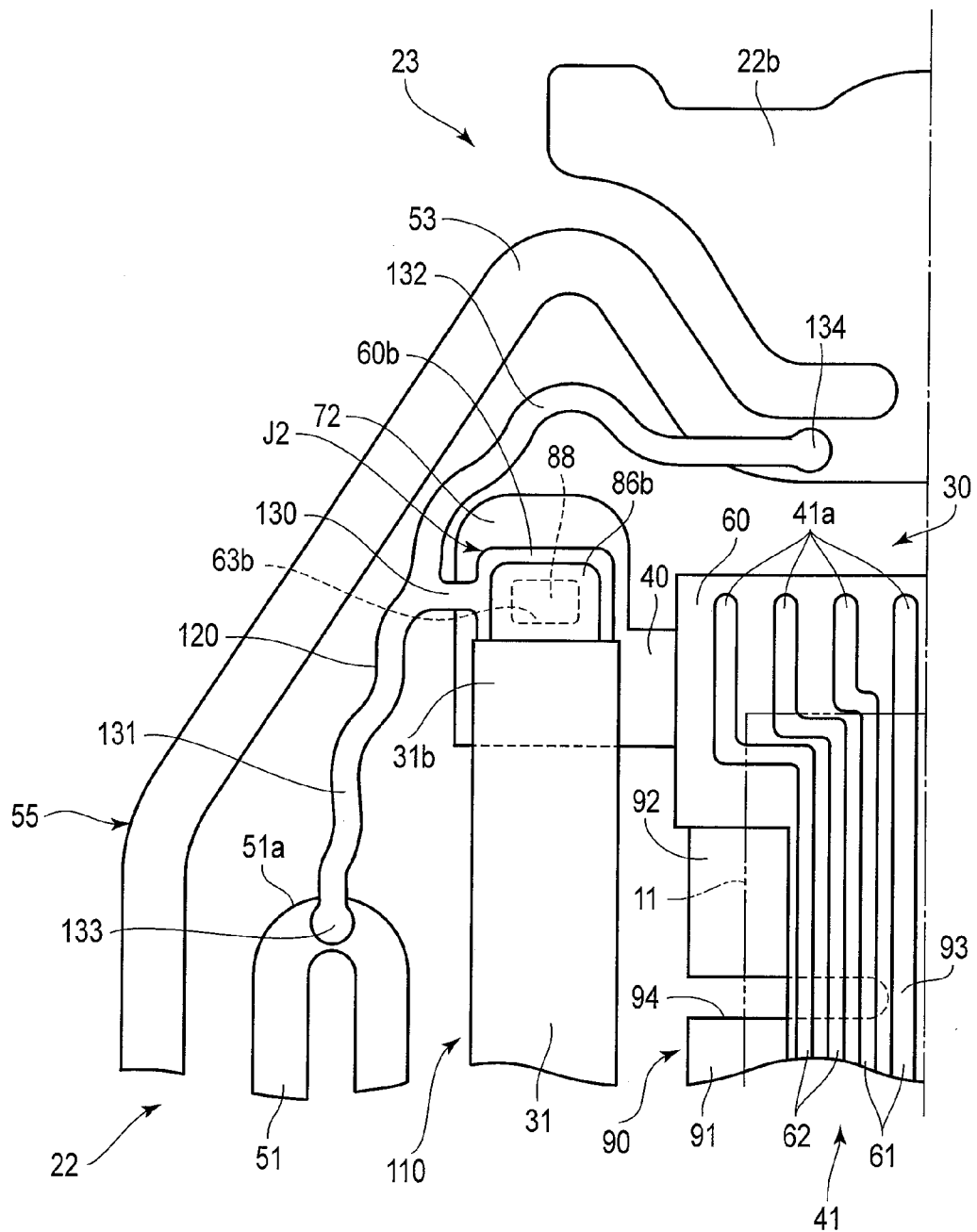
FIG. 13 is an enlarged bottom view of a second joint portion of the microactuator element of FIG. 7.

The opposite end portions 31a and 31b of the element 31 are secured to the gimbal portion 30 and electrically connected to the conductive circuit portion 41 by the joint portions J1 and J2. FIG. 12 is an enlarged view showing the first joint portion J1 and its surroundings. FIG. 13 is an enlarged view showing the second joint portion J2 and its surroundings. Since joint portions at the opposite end portions 32a and 32b of the other microactuator element 32 are constructed in the same manner as those shown in FIGS. 9, 12 and 13, the joint portions J1 and J2 of the one microactuator element 31 will be representatively described below.

As shown in FIG. 9, the microactuator element 31 comprises an element body 80 and first and second electrodes 81 and 82 formed on the peripheral surface of the element body 80. The element body 80 consists of, for example, lead zirconate titanate (PZT). The first electrode 81 is disposed on at least an end surface (first end surface 33) of the first end portion 31a. For example, the first electrode 81 of the present embodiment is provided ranging from the first end surface 33 of the element 31 to a lower surface 34 thereof.

The second electrode 82 is disposed on at least an end surface (second end surface 35) of the second end portion 31b. For example, the second electrode 82 of the present embodiment is provided ranging from the second end surface 35 of the element 31 to an upper surface 36 thereof. Slits 37 and 38 for electrical insulation are formed between the first and second electrodes 81 and 82.

At the first joint portion J1, as shown in FIGS. 9 and 12, a first conductor 87a is disposed on the first supporting portion 70. The first conductor 87a is formed on a part 60a of the insulating layer 60 of the conductive circuit portion 41. A first opening 63a is formed in the cover layer 63. At least a part of the upper surface of the first conductor 87a is exposed inside the first opening 63a. In FIG. 12 showing the conductive circuit portion 41, illustration of the cover layer (FIG. 8) is omitted.

At the second joint portion J2, as shown in FIGS. 9 and 13, a second conductor 88 on the ground side is disposed on the second supporting portion 72. The second conductor 88 is secured to and conducts to the metal base 40. A second opening 63b is formed in the cover layer 63. At least a part of the upper surface of the second conductor 88 is exposed inside the second opening 63b.

The first end portion 31a of the microactuator element 31 is secured to the first supporting portion 70 of the gimbal portion 30 by an electrically insulating first adhesive 85a (FIG. 9). More specifically, microactuator element 31 comprises a corner portion 33a at which the first end surface 33 and lower surface 34 intersect with each other. The corner portion 33a is secured to the metal base 40 by the first adhesive 85a, e.g., an epoxy resin.

A first electrically conductive paste (e.g., silver paste) 86a is provided between the first electrode 81 on the first end surface 33 and the first conductor 87a. The first paste 86a serves as conduction means for electrical connection between the first electrode 81 and first conductor 87a. The first adhesive 85a and first paste 86a serve as fixing means for securing the first end portion 31a of the element 31 to the first supporting portion 70. An angle θ1 (FIG. 9) between the first end surface 33 and the upper surface of the first conductor 87a is a substantially right angle (90°).

The second end portion 31b of the microactuator element 31 is secured to the second supporting portion 72 of the gimbal portion 30 by an electrically insulating second adhesive 85b (FIG. 9). More specifically, microactuator element 31 comprises a corner portion 35a at which the lower surface 34 and second end surface 35 intersect with each other. The corner portion 35a is secured to the metal base 40 by the second adhesive 85b, e.g., an epoxy resin.

A second electrically conductive paste (e.g., silver paste) 86b is provided between the second electrode 82 on the second end surface 35 and the second conductor 88 on the ground side. The second paste 86b serves as conduction means for electrical connection between the second electrode 82 and second conductor 88. The second adhesive 85b and second paste 86b serve as fixing means for securing the second end portion 31b of the element 31 to the second supporting portion 72. An angle θ2 (FIG. 9) between the second end surface 35 and the upper surface of the second conductor 88 on the ground side is a substantially right angle (90°).

As shown in FIGS. 5 and 6, the gimbal portion 30 of the flexure 22 comprises a first tongue portion 91 on the stationary side, a movable second tongue portion 92, and a hinge portion 93 formed between the tongue portions 91 and 92. The first tongue portion 91 is formed between the first supporting portions 70 and 71, and the second tongue portion 92 between the second supporting portions 72 and 73. The hinge portion 93 is formed between the first and second tongue portions 91 and 92. The first supporting portions 70 and 71, second supporting portion 72, first and second tongue portions 91 and 92, and hinge portion 93 all constitute a part of the metal base 40, and their respective contours are formed by, for example, etching. The first and second tongue portions 91 and 92 and hinge portion 93 constitute a tongue 90 configured to carry the slider 11 thereon.

As shown in FIG. 7, the conductive circuit portion 41 diverges left and right and passes above the first and second tongue portions 91 and 92. Terminals 41a for the slider 11 are formed on the distal end of the conductive circuit portion 41. These terminals 41a conduct to the conductors 61 and 62 of the conductive circuit portion 41 and are electrically connected to the elements 28 (FIG. 4) of the slider 11. The conductors 87 for microactuator elements 31 and 32 are provided individually on the opposite sides, left and right, of the conductive circuit portion 41. The conductors 87 conduct to the conductor 87a on the first supporting portions 70 and 71.

The conductive circuit portion 41 comprises first and second wiring pattern portions 41b and 41c. The first wiring pattern portion 41b is disposed between microactuator elements 31 and 32. The second wiring pattern portion 41c extends rearwardly relative to the gimbal portion 30 from the first wiring pattern portion 41b. A curved portion 41d is formed on a longitudinal part of the second wiring pattern portion 41c. The curved portion 41d serves to reduce the bending stiffness of the conductive circuit portion 41 between the first arms 51 and 52.

Thus, the conductive circuit portion 41 comprises the first wiring pattern portion 41b disposed between the pair of microactuator elements 31 and 32. The first wiring pattern portion 41b passes between microactuator elements 31 and 32. The first wiring pattern portion 41b extends rearwardly relative to the gimbal portion 30 from the leading-side portion 11a of the slider 11. The hinge portion 93 is provided between the microactuator elements 31 and 32. In other words, the first wiring pattern portion 41b passes on each side of the hinge portion 93 and extends longitudinally relative to the gimbal portion 30. Further, the first wiring pattern portion 41b is secured to the first and second tongue portions 91 and 92 through the insulating layer 60 of polyimide or the like.

Figure 11:
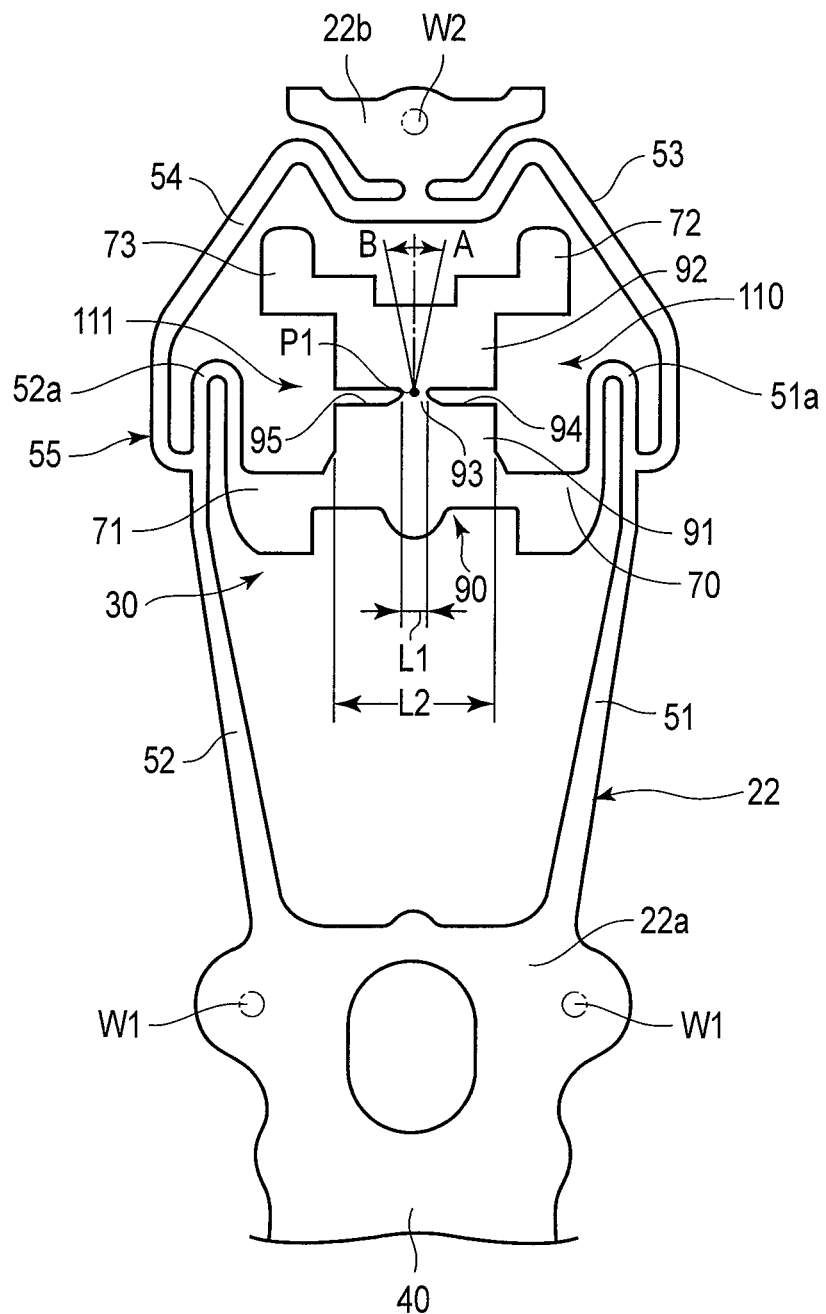
FIG. 11 is a plan view of the gimbal portion of the flexure of the microactuator mounting section of FIG. 5.

FIG. 10 is a partial sectional view of the load beam 21 and gimbal portion 30 taken at the location of the hinge portion 93. FIG. 11 is a plan view of the gimbal portion 30. Width L1 of the hinge portion 93 is sufficiently smaller than width L2 of each of the first and second tongue portions 91 and 92. Slits 94 and 95 are formed between the tongue portions 91 and 92 on the opposite sides of the hinge portion 93, individually. The tongue portions 91 and 92 are relatively pivotably connected together by the constricted hinge portion 93. Thus, the movable second tongue portion 92 is configured to move relative to the first tongue portion 91 on the stationary side in the directions indicated by arrows A and B in FIG. 11.

The slider 11 is disposed on the first and second tongue portions 91 and 92 and hinge portion 93. Further, a leading-side portion 11a of the slider 11 is disposed for movement relative to the first tongue portion 91. A trailing-side portion 11b of the slider 11 is secured to the second tongue portion 92. The "leading side" stated herein is the side where air flows in between the slider 11 and disk 4 as the disk rotates. On the other hand, the "trailing side" is the side where air between the slider 11 and disk 4 comes out. The hinge portion 93 is formed in a center position 11c of the slider 11, e.g., the center of gravity of the slider 11 or the center thereof with respect to both transverse and longitudinal directions.

A dimple 100 (FIG. 10) is formed near the distal end of the load beam 21. The dimple 100 comprises a supporting protrusion 100a formed of a convex surface projecting toward the gimbal portion 30. The distal end of the supporting protrusion 100a abuts the hinge portion 93. In other words, the hinge portion 93 is swingably supported by the convex surface of the dimple 100. Thus, the gimbal portion 30 is supported for swinging motion relative to the load beam 21 about a point of contact P1 between the hinge portion 93 and the distal end of the dimple 100.

Alternatively, a dimple may be formed on the hinge portion 93 such that its distal end abuts the load beam 21. In short, the supporting protrusion 100a, such as the dimple, should only be formed on one of the respective facing surfaces of the load beam 21 and hinge portion 93 so that it abuts the other facing surface.

One opening 110 (on the right-hand side of FIG. 11) is formed between the first and second supporting portions 70 and 72. Opening 110 communicates with the one slit 94. The other opening 111 (on the left-hand side of FIG. 11) is formed between the first and second supporting portions 71 and 73. Opening 111 communicates with the other slit 95.

Since Openings 110 and 111 are thus formed on the opposite sides of the tongue portions 91 and 92, respectively, longitudinal intermediate portions of the elements 31 and 32 can be prevented from contacting the tongue portions 91 and 92. If the suspension 10 is subjected to external mechanical shock, therefore, the longitudinal intermediate portions of the elements 31 and 32 can be prevented from being struck by the tongue portions 91 and 92. Thus, the elements 31 and 32 can be prevented from being damaged by being struck. The longitudinal direction stated herein is the direction of the extending and contracting strokes of microactuator elements 31 and 32.

Microactuator mounting section 23 of the present embodiment comprises limiter members 120 and 121. The limiter members 120 and 121 serve to keep the tongue portions 91 and 92 from excessively vibrating when the molded housing 10 is subjected to external mechanical shock. Also, the limiter members 120 and 121 have the function of keeping the hinge portion 93 from moving away from the dimple 100 (dimple separation).

FIG. 13 shows the limiter member 120 (of the pair of limiter members 120 and 121) on the left-hand side of FIG. 7. The other limiter member 121 is constructed in the same manner as the one limiter member 120 shown in FIG. 13 provided that they are bilaterally symmetrical. Therefore, the one limiter member 120 will be representatively described below. In FIG. 13 showing the conductive circuit portion 41, illustration of the cover layer (FIG. 8) is omitted.

The limiter member 120 shown in FIG. 13 is made of the electrically insulating resin shared with the insulating layer 60 (FIG. 8) of the conductive circuit portion 41. An example of the resin is polyimide. The limiter member 120 is contoured as shown in FIG. 13 by being etched together with the insulating layer 60 as the insulating layer 60 is formed. Alternatively, a limiter member of a predetermined shape may be formed by, for example, applying a resin to a masked metal base.

The limiter member 120 comprises a grounding junction 130, first bridge portion 131, and second bridge portion 132. The grounding junction 130 is secured to the second supporting portion 72. The first bridge portion 131 extends in a first direction (or rearwardly relative to the gimbal portion 30) from the grounding junction 130. The second bridge portion 132 extends in a second direction (or forwardly relative to the gimbal portion 30) from the grounding junction 130. The grounding junction 130 extends outwardly relative to the gimbal portion 30 from a part 60b of the insulating layer 60. The part 60b of the insulating layer 60 is formed on the second supporting portion 72. The second conductor 88 on the ground side is provided on the second supporting portion 72.

A distal end (rear end) 133 of the first bridge portion 131 is connected to the distal end portion 51a of the first arm 51. A distal end (front end) 134 of the second bridge portion 132 is connected to the second arm 53. The first and second bridge portions 131 and 132 are undulating as viewed from above the gimbal portion 30. This shape of the limiter member 120 does not hinder the motion of microactuator elements 31 and 32 that are driven by application of a voltage.

The grounding junction 130 and the respective distal ends 133 and 134 of the first and second bridge portions 131 and 132 are individually secured to the metal base 40 by the adhesivability of the resin of the insulating layer 60. As shown in FIG. 9, the second supporting portion 72 is formed with the second conductor (ground-side conductor) 88. The second conductor 88 electrically connects the metal base 40 and the second electrode 82 of microactuator element 31. The grounding junction 130 is secured to the metal base 40 in such a manner that it is sandwiched between the metal base 40 and second conductor 88 at the second supporting portion 72.

The following is a description of the operation of the suspension 10 of the present embodiment.

If the carriage 6 (FIGS. 1 and 2) is turned by the positioning motor 7, the suspension 10 moves radially relative to the disk 4. Thereupon, the slider 11 of the magnetic head moves to a desired track of the recording surface of the disk 4. If a voltage is applied to microactuator elements 31 and 32, microactuator elements 31 and 32 are oppositely distorted relative to each other as to the voltage. In this way, the load beam 21 can be moved by an infinitesimal distance in the sway direction (indicated by arrow Y in FIG. 3).

Figure 14:
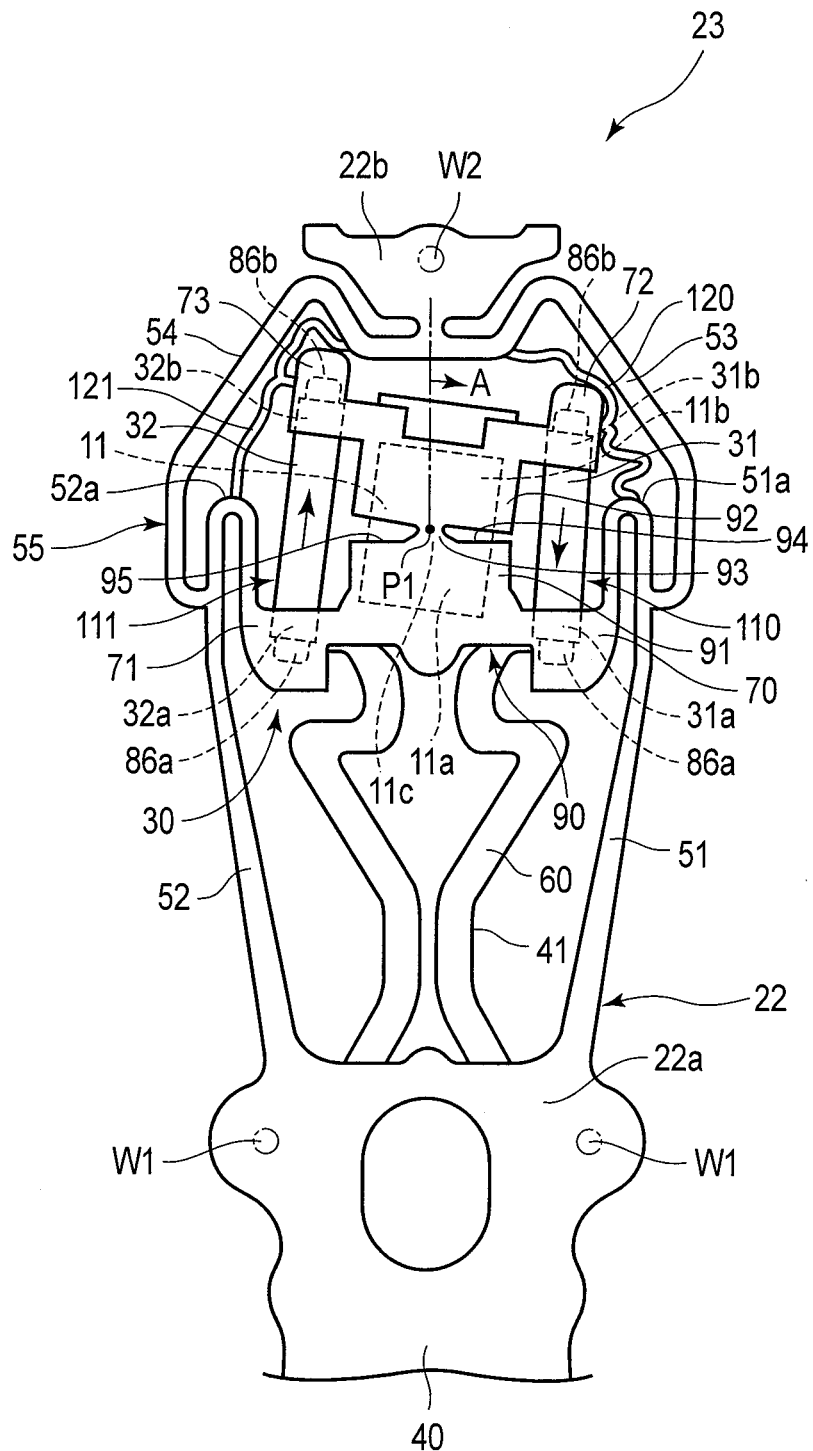
FIG. 14 is a plan view schematically showing the microactuator mounting section with microactuator elements actuated.

As schematically shown in FIG. 14, for example, the second tongue portion 92 moves in the direction of arrow A as the one and the other microactuator elements 31 and 32 contract and extend, respectively. Thus, the elements 28 (FIG. 4) on the slider 11 can be quickly precisely positioned in the sway direction. Actually, the movement distance of the slider 11 in the sway direction ranges from several nm to several tens of nm. In FIG. 14, however, the degree of deformation of the gimbal portion 30 is exaggeratedly indicated for better understanding of the movements of the slider 11 and second tongue portion 92.

In the microactuator mounting section 23 of the present embodiment, the movable second tongue portion 92 pivots transversely about the hinge portion 93, with respect to the first tongue portion 91 on the stationary side, if microactuator elements 31 and 32 are driven. The trailing-side portion 11b of the slider 11 is secured to the second tongue portion 92. In contrast, the leading-side portion 11a of the slider 11 is movable relative to the first tongue portion 91. As shown in FIG. 10, the distal end of the dimple 100 abuts the hinge portion 93 at the point of contact P1.

If the microactuator elements 31 and 32 are driven by application of a voltage, therefore, the second tongue portion 92 and slider 11 pivot about the point of contact P1 with the dimple 100. Thus, the pivot center of the slider 11 can be matched with the position of the contact point P1. In this way, the distal end of the dimple 100 can be kept from rubbing against the flexure 22 when microactuator elements 31 and 32 are driven (or when the slider 11 is pivoted). Thus, production of high frictional resistance or a causative agent of contamination during the pivoting motion of the second tongue portion 92 can be suppressed.

In addition, microactuator elements 31 and 32 are disposed on the second surface 30b of the gimbal portion 30 on the same side as the slider 11. Therefore, the thickness of each of microactuator elements 31 and 32 need not be made smaller than the projection height of the dimple 100. Accordingly, thick structures can be used for microactuator elements 31 and 32. Thus, the available microactuator elements 31 and 32 provide high output load and mechanical strength and are hard to break.

As described above, the first wiring pattern portion 41b is disposed between microactuator elements 31 and 32. The first wiring pattern portion 41b passes on each side of the hinge portion 93 and extends longitudinally relative to the gimbal portion 30. Specifically, the first wiring pattern portion 41b passes near the contact point P1 of the hinge portion 93 where the driven microactuator elements 31 and 32 move little. The second wiring pattern portion 41c extends rearwardly relative to the gimbal portion 30 from between microactuator elements 31 and 32.

In the microactuator mounting section 23 comprising the conductive circuit portion 41 constructed in this manner, the driven elements 31 and 32 move less than in a conventional version in which a conductive circuit portion is disposed outside microactuator elements. Accordingly, the conductive circuit portion 41 can be kept from being tensioned or flapping while the elements 31 and 32 are driven. In addition, the conductive circuit portion 41 is not located above the elements 31 and 32, so that the elements 31 and 32 can be prevented from being damaged by contact with the conductive circuit portion 41.

As shown in FIG. 9, the second conductor 88 on the ground side is provided on the second supporting portion 72. The second conductor 88 electrically connects the metal base 40 and the second electrode 82 of the microactuator element 31. The second conductor 88 is secured to the metal base 40. Accordingly, the grounding junction 130 of the limiter member 120 is firmly secured by the second conductor 88 and the metal base 40 at the second supporting portion 72. Thus, the grounding junction 130 cannot be easily separated from the metal base 40 at the second supporting portion 72. If the second tongue portion 92 pivots with the element 31 driven or is externally jolted, stress is repeatedly applied to the grounding junction 130. Despite this stress, the grounding junction 130 cannot be easily separated from the second supporting portion 72.

The microactuator mounting section 23 of the present embodiment comprises the joint portions J1 and J2 with the above-described construction. These joint portions J1 and J2 serve to prevent sliding separation from an adhesive surface of the electrically conductive paste 86a. FIG. 9 shows the joint portions J1 and J2 of the one microactuator element 31. In this case, the first end portion 31a of the element 31 is secured to the metal base 40 by the electrically insulating adhesive 85a. The electrically conductive paste 86a is provided between the first conductor 87a and the first electrode 81 that covers the first end surface 33. The second end portion 31b of the element 31 is secured to the metal base 40 by the electrically insulating adhesive 85b. The electrically conductive paste 86b is provided between the second conductor 88 and the second electrode 82 that covers the second end surface 35. At the joint portions, the opposite end portions 31a and 31b of the element 31 can be reliably secured by the adhesives 85a and 86b and electrically conductive pastes 86a and 86b and electrically connected by the pastes 86a and 86b.

The electrically conductive pastes 86a and 86b comprise, for example, a thermosetting binder and silver particles mixed therein. The binder is cured if the pastes 86a and 86b are heated. These pastes 86a and 86b are more fragile and less adhesive than the adhesives 85a and 85b, e.g., an epoxy resin. If an in-plane shearing force is repeatedly applied to the adhesive surface, in particular, slippage may occur on the adhesive surface, resulting in separation.

If microactuator element 31 extends in the stroke direction at the joint portions J1 and J2 shown in FIG. 9, in this regard, a compressive force acts on the end surface 33 of the first end portion 31a, as indicated by arrow F1. When this is done, only a force in the direction of compression is applied to the adhesive surface between the first end surface 33 and electrically conductive paste 86a. Thus, there is no possibility of the adhesive surface on the first end surface 33 being separated. The first end portion 31a is secured to the first supporting portion 70 by the adhesive 85a in the vicinity of the corner portion 33a. The compressive force transmitted from the first end surface 33 to the paste 86a is applied toward the first conductor 87a, as indicated by arrows F2. This compressive force is dispersed while being transmitted to the first conductor 87a. Accordingly, a force applied along adhesive surface F3 between the paste 86a and first conductor 87a is small. In addition, a part of the paste 86a is cured in the first opening 63a of the cover layer 63. Even if an in-plane shearing force is applied to adhesive surface F3 between the paste 86a and first conductor 87a, therefore, it can be received by the cover layer 63, so that separation due to slippage on the adhesive surface can be suppressed. Thus, electrical conduction between the first electrode 81 and first conductor 87a can be ensured.

If the microactuator element 31 is extensively deformed, a compressive force also acts on the end surface 35 of the second end portion 31b, as indicated by arrow F4. When this is done, only a force in the direction of compression is applied to the adhesive surface between the second end surface 35 and electrically conductive paste 86b. Thus, there is no possibility of the adhesive surface on the second end surface 35 being separated. The second end portion 31b is secured to the second supporting portion 72 by the second adhesive 85b in the vicinity of the corner portion 35a. The compressive force transmitted from the second end surface 35 to the paste 86b is applied toward the second conductor 88, as indicated by arrows F5. This compressive force is dispersed while being transmitted to the second conductor 88. Accordingly, a force applied along adhesive surface F6 between the paste 86b and second conductor 88 is small. In addition, a part of the paste 86b is cured in the second opening 63b of the cover layer 63. Even if an in-plane shearing force is applied to adhesive surface F6 between the paste 86b and second conductor 88, therefore, it can be received by the cover layer 63, so that separation due to slippage on the adhesive surface can be suppressed. Thus, electrical conduction between the second electrode 82 and second conductor 88 can be ensured.

According to the joint portions J1 and J2 of the present embodiment, moreover, insulation distances from the electrically conductive pastes 86a and 86b to the slits 37 and 38 can be extended. In addition, the pastes 86a and 86b can be kept from partially getting into the slits 37 and 38. It is unnecessary, moreover, to dispose conducting members, such as lead wires or bonding wires, near the surfaces of microactuator elements 31 and 32. Thus, the elements 31 and 32 can be prevented from being damaged by contact with the conducting members.

Figure 15:
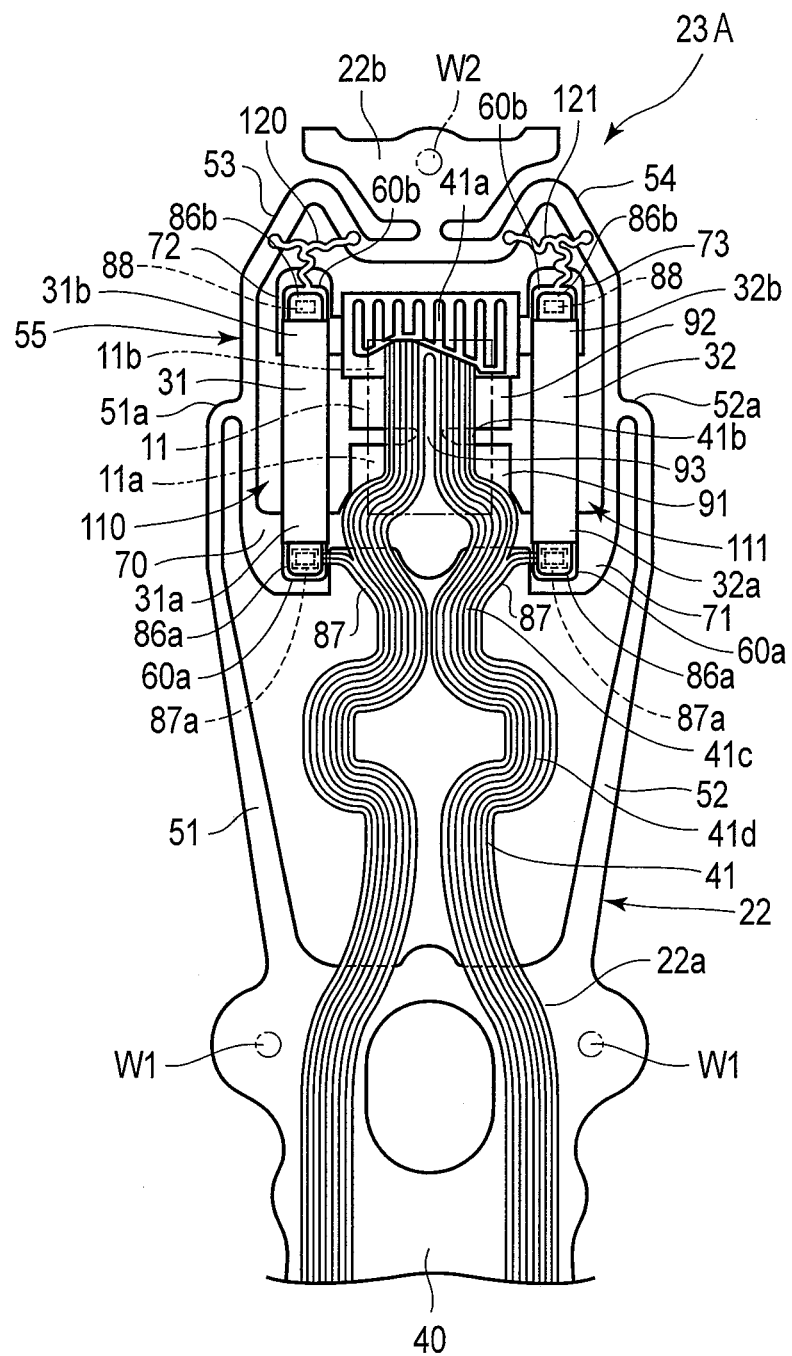
FIG. 15 is a bottom view of a microactuator mounting section according to a second embodiment.

FIG. 15 shows a microactuator mounting section 23A according to a second embodiment. Microactuator mounting section 23A of this embodiment is slightly different from microactuator mounting section 23 of the first embodiment in the forms of first arms 51 and 52 and second arms 53 and 54. Specifically, the second arms 53 and 54 of microactuator mounting section 23A of FIG. 15 are located inside the first arms 51 and 52, respectively. Further, respective distal end portions 51a and 52a of the first arms 51 and 52 are connected to the second arms 53 and 54, respectively. Limiter members 120 and 121 are connected to second supporting portions 72 and 73 and the second arms 53 and 54, respectively. Since other configurations and effects are common to microactuator mounting sections 23 and 23A of the first and second embodiments, common numbers are used to designate common portions of the first and second embodiments, and a description of those portions is omitted.

FIG. 16 shows a microactuator mounting section 23B according to a third embodiment. Second arms 53 and 54 of this embodiment are connected to first arms 51 and 52, respectively. The second arms 53 and 54 are not secured to a load beam. First supporting portions 70 and 71, a first tongue portion 91, and the second arms 53 and 54 are supported on a stationary part 22a of a flexure 22 by the first arms 51 and 52. Limiter members 120 and 121 are provided spanning between second supporting portions 72 and 73 and the second arms 53 and 54, respectively. Since other configurations and effects are common to microactuator mounting sections 23 and 23B of the first and third embodiments, common numbers are used to designate common portions of the first and third embodiments, and a description of those portions is omitted.

Figure 17:
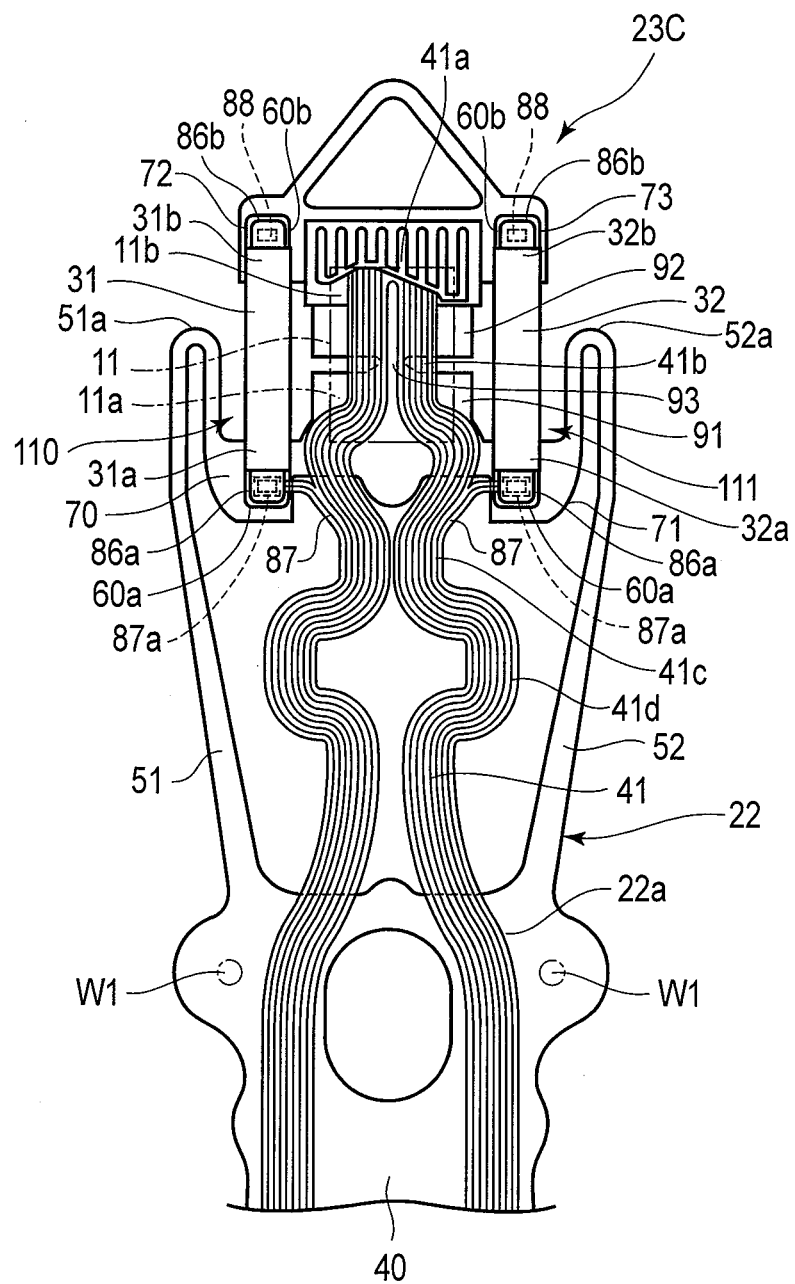
FIG. 17 is a bottom view of a microactuator mounting section according to a fourth embodiment.

FIG. 17 shows a microactuator mounting section 23C according to a fourth embodiment. First supporting portions 70 and 71 and a first tongue portion 91 of this embodiment are supported on a stationary part 22a of a flexure 22 by first arms 51 and 52 only. Since other configurations and effects are common to microactuator mounting sections 23B and 23C of the third (FIG. 16) and fourth embodiments, common numbers are used to designate common portions of the third and fourth embodiments, and a description of those portions is omitted.

It is to be understood, in carrying out the present invention, that the specific forms of the constituent elements of the microactuator mounting section, including the first and second supporting portions of the gimbal portion, first and second adhesives, and first and second electrically conductive pastes, as well as the shapes, arrangement, etc., of the microactuator elements, may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims.

What is claimed is:

1. A disk drive suspension which comprises a load beam and a flexure that is formed of a metal base made of a stainless steel plate and that comprises a stationary part secured to the load beam and a gimbal portion on which a slider is mounted, the disk drive suspension further comprising:
    a pair of microactuator elements disposed on either side of the slider and each comprising a first end portion and a second end portion;
    a pair of first supporting portions formed of a part of the stainless steel plate to which the first end portions of the pair of microactuator elements are individually secured in a thickness direction of the stainless steel plate;
    a pair of second supporting portions formed of another part of the stainless steel plate to which the second end portions of the pair of microactuator elements are individually secured in the thickness direction of the stainless steel plate;
    a tongue on which the slider is mounted;
    a first conductor provided on each of the pair of first supporting portions;
    a second conductor provided on each of the pair of second supporting portions;
    a first electrode provided on at least an end surface of each of the first end portions of the pair of microactuator elements;
    a second electrode provided on at least an end surface of each of the second end portions of the pair of microactuator elements;
    an electrically insulating first adhesive which secures the first end portions of the pair of microactuator elements and the pair of first supporting portions of the stainless steel plate to one another respectively in the thickness direction of the stainless steel plate;
    an electrically insulating second adhesive which secures the second end portions of the pair of microactuator elements and the pair of second supporting portions of the stainless steel plate to one another respectively in the thickness direction of the stainless steel plate;
    a first electrically conductive paste which is provided between the first conductor and the first electrode on the end surface of each of the first end portion portions and which electrically connects the first electrode and the first conductor to each other; and
    a second electrically conductive paste which is provided between the second conductor and the second electrode on the end surface of each of the second end portions and which electrically connects the second electrode and the second conductor to each other.

2. The disk drive suspension of claim 1, wherein the tongue comprises:
    a first tongue portion which is formed between the pair of first supporting portions and on which a leading-side portion of the slider is disposed for movement,
    a second tongue portion which is formed between the pair of second supporting portions and to which a trailing-side portion of the slider is secured, and
    a hinge portion which is formed between the first and second tongue portions, is narrower than the first and second tongue portions, and pivotably connects the first and second tongue portions.

3. The disk drive suspension of claim 2, wherein a distal end of a convex surface of a dimple formed on the load beam abuts the hinge portion of the tongue.

4. The disk drive suspension of claim 3, wherein the second conductor is a ground-side conductor for electrical connection between the metal base and the second electrode of each of the pair of microactuator elements.

5. The disk drive suspension of claim 2, wherein the second conductor is a ground-side conductor for electrical connection between the metal base and the second electrode of each of the pair of microactuator elements.

6. The disk drive suspension of claim 1, wherein the second conductor is a ground-side conductor for electrical connection between the metal base and the second electrode of each of the pair of microactuator elements.

7. The disk drive suspension of claim 1, further comprising:
    a first cover layer which covers each first conductor and comprises a first opening through which a part of an upper surface of each first conductor is exposed, and
    a second cover layer which covers each second conductor and comprises a second opening through which a part of an upper surface of each second conductor is exposed,
    wherein a part of the first electrically conductive paste is contained in each first opening and a part of the second electrically conductive paste is contained in each second opening.

8. A disk drive suspension which comprises a load beam and a flexure formed of a metal base and comprising a stationary part secured to the load beam and a gimbal portion on which a slider is mounted, the disk drive suspension further comprising:
    a pair of microactuator elements disposed on either side of the slider and each comprising a first end portion and a second end portion;
    a pair of first supporting portions of the gimbal portion to which the first end portions of the pair of microactuator elements are individually secured;
    a pair of second supporting portions of the gimbal portion to which the second end portions of the pair of microactuator elements are individually secured;
    a tongue on which the slider is mounted, the tongue comprising: (i) a first tongue portion which is formed between the pair of first supporting portions and on which a leading-side portion of the slider is disposed, (ii) a second tongue portion which is formed between the pair of second supporting portions and to which a trailing-side portion of the slider is secured, and (iii) a hinge portion which is formed between the first and second tongue portions, is narrower than the first and second tongue portions, and connects the first and second tongue portions;

a first conductor provided on each of the pair of first supporting portions;

a second conductor provided on each of the pair of second supporting portions;

a first electrode provided on at least an end surface of each of the first end portions of the pair of microactuator elements;

a second electrode provided on at least an end surface of each of the second end portions of the pair of microactuator elements;

an electrically insulating first adhesive which secures the first end portions of the pair of microactuator elements and the pair of first supporting portions to one another;

an electrically insulating second adhesive which secures the second end portions of the pair of microactuator elements and the pair of second supporting portions to one another;

a first electrically conductive paste which is provided between the first conductor and the first electrode on the end surface of each of the first end portions and which electrically connects the first electrode and the first conductor to each other; and a second electrically conductive paste which is provided between the second conductor and the second electrode on the end surface of each of the second end portions and which electrically connects the second electrode and the second conductor to each other.

* * * * *